United States Patent [19]

Queneau et al.

[11] 4,320,095

[45] Mar. 16, 1982

[54] AUTOCLAVE SODA DIGESTION OF REFRACTORY SCHEELITE CONCENTRATES

[75] Inventors: Paul B. Queneau; Dale K. Huggins, both of Golden; Leo W. Beckstead, Arvada, all of Colo.

[73] Assignee: Amax Inc., Greenwich, Conn.

[21] Appl. No.: 225,913

[22] Filed: Jan. 19, 1981

[51] Int. Cl.³ ............................................... C01G 41/00
[52] U.S. Cl. ........................................ 423/61; 423/53; 423/58
[58] Field of Search ............................. 423/53, 58, 61; 75/101 R

[56] References Cited

U.S. PATENT DOCUMENTS

| | | | |
|---|---|---|---|
| 2,351,678 | 6/1944 | Hall | 423/58 |
| 3,429,693 | 2/1969 | Bauer et al. | 423/61 |
| 4,092,400 | 5/1978 | Zbranek et al. | 423/54 |
| 4,167,555 | 9/1979 | Gomes et al. | 423/61 |

OTHER PUBLICATIONS

Grigoriu et al., "Chemical Absts.," vol. 61, 1964, #9209a.

Zelikman et al., "Chemical Absts.," vol. 89, 1978, #133099p.

Perlov et al., "Chemical Absts.," vol. 77, 1972, #23288d.

Primary Examiner—Herbert T. Carter
Attorney, Agent, or Firm—Michael A. Ciomek; Eugene J. Kalil

[57] ABSTRACT

A process for the soda ash digestion of refractory tungsten concentrates is provided, the process comprising forming a slurry of the concentrate in an aqueous solution to which sodium carbonate is added in stages while digesting the slurry in an autoclave at a selected elevated temperature of at least about 180° C. to control the concentration of the sodium carbonate during digestion to provide high extraction yields of the contained $WO_3$. The total amount of the $Na_2CO_3$ added stagewise to complete the digestion is substantially inversely correlated to the digestion temperature and substantially directly correlated to the $Na_2CO_3/WO_3$ weight ratio such as to effect dissolution of at least about 97%, and generally at least about 98%, of the $WO_3$ in the concentrate and provide a pregnant liquor containing $WO_3$, the stage-wise addition of the sodium carbonate being such as to inhibit the dissolution of gangue minerals, such as silica, contained in the concentrate.

22 Claims, No Drawings

AUTOCLAVE SODA DIGESTION OF REFRACTORY SCHEELITE CONCENTRATES

This invention relates to a process for extracting tungsten from tungsten concentrates, for example, scheelite concentrates, and, in particular, to the soda ash digestion of substantially low-grade tungsten concentrates.

This application is related to application U.S. Ser. No. 225,914, filed Jan. 19, 1981, the disclosure of which is incorporated herein by reference.

STATE OF THE ART

It is known to recover tungsten from its ores. Generally, the ore is concentrated by gravity and flotation methods and the concentrate thereafter treated to recover tungsten therefrom as a substantially pure compound.

One method which is applicable to ores of low tungsten content, as well as rich ores and concentrates, is disclosed in U.S. Pat. No. 2,351,678. The tungsten-containing material is finely ground and then subjected to dissolution in a solution of soda ash ($Na_2CO_3$). The dissolution of scheelite, for example, is carried out in the soda ash solution at an elevated temperature corresponding to a pressure of about 200 lbs/in$^2$ gauge or at about 380° F. to 390° F. (193° C.–199° C.) in a closed vessel, e.g., an autoclave. The pulp ratio employed in the autoclave may comprise 3 parts water to 1 part of flotation concentrated by weight. To the concentrate is added soda ash (sodium carbonate) generally in the amount of 2 parts or more to 1 part of $WO_3$ equivalent in the concentrate. The reaction results in a solution containing sodium tungsten ($Na_2WO_4$), and excess unreacted sodium carbonate, the time varying from about 2½ to 4 hours. Calcium carbonate forms as an insoluble concentrate. The excess sodium carbonate is subsequently neutralized with acid and the tungsten in solution converted to iron tungstate by the addition of ferrous sulfate.

One of the disadvantages of the foregoing patented method is the relatively high consumption of soda ash and the rather high acid demand which adds to the cost of the process. Moreover, leaching solutions with relatively high sodium carbonate alkalinity tend to cause dissolution of silica contained in said concentrate which should be avoided as much as possible.

Autoclave soda ash digestion of scheelite is well established commercially and is being used in several plants around the world to process off-grade scheelite concentrates. One plant has operated in California for some time in which scheelite concentrates of approximately 10% to 20% $WO_3$ have been treated using soda ash digestion. A similar soda ash digestion plant is operating in Austria. A disadvantage of such processes is the use of relatively large amounts of sodium carbonate at $Na_2CO_3/WO_3$ ratios of over 1.8:1, such ratios tending to favor the dissolution of gangue in the concentrate.

Recently, a particular low-grade refractory scheelite concentrate which has presented problems is a concentrate produced by the Canadian Tungsten Mining Corporation (CanTung concentrate). While certain of the concentrates are classified as "leachable" concentrates in that a dilute hydrochloric acid leach can produce a tungsten product containing 60% to 65% $WO_3$, others contain large amounts of silica minerals and proportionately smaller amounts of alkaline earth carbonates. Such concentrates appear to be unleachable in that dilute acid leaching improves the grade to only about 40% to 55% $WO_3$. These so-called "non-leachable" concentrates, while being capable of being digested in soda ash solutions, presented the problem of yield; that is to say, dissolution yields were not always as high as desired, i.e., in excess of 95% dissolution rate, such as in excess of 97%. In addition, there was the problem of selectivity with regard to avoiding dissolution of substantial amounts of gangue constituents.

RELATED APPLICATION

In said related application a process is disclosed for the soda ash digestion of low-grade tungsten concentrates containing about 2% to 40% $WO_3$, generally about 5% to 30%, e.g., about 10% to 20%, although the process is also applicable to high-grade concentrates containing upwards of 70% by weight $WO_3$.

The process is based on the recognition of a surprising interaction between soda ash concentration, the $Na_2CO_3/WO_3$ weight ratio, the aqueous tungsten concentration in the pregnant liquor, and the temperature employed in the digestion of scheelite concentrates in aqueous soda ash solution; and that by taking advantage of the interrelationships between the aforementioned four parameters, it has been possible to reduce substantially the amount of soda ash required to attain the desired tungsten extraction, to minimize the excess soda ash in the pregnant liquor, and to provide maximum extraction yield of the tungsten as $WO_3$, as well as achieve maximum $WO_3$ concentration in the pregnant liquor, while inhibiting substantial dissolution of gangue minerals.

The process disclosed in the related application resides in forming a slurry of scheelite concentrate in an aqueous sodium carbonate solution of concentration ranging from about 50 gpl to 200 gpl at a $Na_2CO_3/WO_3$ weight ratio of about 0.9 to 1.6 and then digesting the slurry in an autoclave at a temperature ranging from about 180° C. to 310° C., e.g., about 200° C. to 250° C., preferably from about 200° C. to 235° C. The desired efficiency and the selectivity of digestion can be attained by employing the $Na_2CO_3$ concentration of the leach solution in substantially inverse relationship with the digestion temperature and in substantially direct relationship with the $Na_2CO_3/WO_3$ weight ratio, so long as the initial $Na_2CO_3/WO_3$ ratio is controlled over the range of about 0.9 to 1.6, the relationship selected being such as to effect dissolution of at least about 95% of the $WO_3$ in the concentrate, preferably at least about 97% or 98%, and provide a pregnant liquor containing said $WO_3$ normally obtained using an all-at-once addition of $Na_2CO_3$.

Extraction yields or efficiencies of over 98% are particularly desirable for low-grade tungsten concentrates. However, if the low-grade concentrate tends to be too refractory, it is difficult to achieve the desired extraction levels of 98% or higher using an all-at-once addition without increasing the $Na_2CO_3/WO_3$ ratio.

We have now found that low-grade tungsten concentrates can be successfully treated in a highly selective manner to provide high extraction yields by controlling the amount and concentration of $Na_2CO_3$ by stage-wise addition to be described hereinafter and by employing a broader range of the $Na_2CO_3/WO_3$ ratio of about 0.9 to 2 while still inhibiting substantial dissolution of gangue minerals.

OBJECTS OF THE INVENTION

It is thus an object of the invention to provide an improved method for the soda ash digestion of scheelite concentrates, for example, low-grade refractory concentrates normally difficult to digest.

Another object is to provide a method for substantially completely digesting low-grade scheelite tungsten concentrates in an autoclave using an aqueous sodium carbonate solution of controlled concentration correlated to the $Na_2CO_3/WO_3$ weight ratio, aqueous tungsten concentration produced during digestion and digestion temperature, wherein the amount of $Na_2CO_3$ added is controlled by stage-wise additions.

These and other objects will more clearly appear when taken in conjunction with the following disclosure and the appended claims.

SUMMARY OF THE INVENTION

The improved process provided by the invention is directed to the soda ash digestion of refractory tungsten concentrates, e.g.. low-grade scheelite concentrates containing at least about 2% silica, the process comprising; forming a slurry of the concentrate with an aqueous solution of sodium carbonate, the amount of sodium carbonate being a fractional portion of that total amount predetermined to effect substantially complete dissolution of the tungsten as $WO_3$ equivalent in the concentrate at an elevated temperature selected for said digestion, the predetermined amount of sodium carbonate being such that $Na_2CO_3/WO_3$ weight ratio ranges broadly from about 0.9 to 2. The concentrate is digested with the solution containing said fractional portion of sodium carbonate at a selected temperature in the range of about 180° C. to 310° C., and then, while the slurry is being digested at said selected temperature, adding the remaining fractional portion of said sodium carbonate in at least one stagewise addition, e.g., in incremental stages, or continuously, to control the concentration thereof in the solution during digestion and effect substantially complete dissolution of said $WO_3$ in the refractory concentrate. The total amount of the predetermined sodium carbonate addition following completion of stage-wise addition is selected to correspond to an all-at-once addition of sodium carbonate to produce an initial concentration prior to reaction ranging from about 50 gpl to 200 gpl over said $Na_2CO_3/WO_3$ weight ratio of 0.9 to 2, with the concentration of $Na_2CO_3$ substantially inversely correlated to the digestion temperature and substantially directly correlated to the $Na_2CO_3/WO_3$ weight ratio, whereby at least about 95% or 97% or 98% of the $WO_3$ equivalent in the concentrate is dissolved to provide a pregnant solution thereof at the desired concentration, while substantially inhibiting dissolution of gangue minerals, such as $SiO_2$, CaO, among others.

By employing stage-wise addition of the sodium carbonate as an essential feature of the invention during digestion, less sodium carbonate need be employed to effect substantially complete dissolution of $WO_3$ contained in the concentrate.

As an optional feature, consistently high extraction may also be achieved by replacing a part of the sodium carbonate with sodium hydroxide and/or by employing a grinding step prior to digestion to further improve leachability.

DETAILS OF THE INVENTION

In copending U.S. application Ser. No. (File No. 06) referred to herein, it is disclosed that fairly high extraction yields of $WO_3$ from typical CanTung concentrates are obtained by employing relatively low $Na_2CO_3$ concentrations coupled with a relatively high temperature (e.g., 230° C. or 250° C.). For example, a typical leach condition employed on a CanTung concentrate containing about 15% by weight of $WO_3$ is one in which the solution contains 150 gpl $Na_2CO_3$, about 1.2 lbs/lb $Na_2CO_3/WO_3$ and in which the concentrate is leached for 2 hours at 230° C. to produce a pregnant liquor relatively high in $WO_3$ (125 gpl) accompanied by relatively low soda ash consumption (2.6×stoichiometric) and high $WO_3$ extraction (99+%).

However, when applying the foregoing conditions on a variety of concentrates, e.g., low-grade scheelite concentrates containing by weight about 2% to 40% $WO_3$ (e.g., about 10% to 30% $Wo_3$), or even concentrates containing about 2% to 70% $WO_3$, the extraction may drop to below 99%, e.g., drop to 97%. Thus, concentrates for which the extraction is not as complete as desired under such digesting conditions are termed "refractory", such as concentrates containing gangue minerals, such as up to about 30% by weight of CaO and about 2% to 50% silica. Of the methods explored for enhancing digestion consistency, the stage-wise addition of $Na_2CO_3$ during digestion of the concentrate has been particularly beneficial in overcoming the aforementioned problem and in substantially inhibiting gangue dissolution. The presence of magnesium as a magnesium-containing compound has been found to be helpful in further inhibiting the dissolution of silica. The magnesium compound may be naturally present or deliberately added as dolomite in an amount of about 2% to 10% of magnesium by weight of the concentrate, for example, about 4% to 6%. The dissolution of silica may be inhibited to below about 1000 ppm, preferably below about 500 ppm, e.g., below about 100 ppm.

Results have shown that stage-wise addition of $Na_2CO_3$ is effective for improving tungsten extraction from refractory CanTung scheelite concentrates. Using the digestion conditions set forth herein, and adding about one-half of the soda ash at the beginning, the $WO_3$ extraction was noted to increase from 97% up to 99% when the remaining half of the $Na_2CO_3$ was added at temperature rather than adding all at the beginning. This technique is also useful for minimizing formation of $Na_2CO_3-CaCO_3$ double salt in the form of scale on the walls of the autoclave which is an important consideration.

Tests have also indicated that consistently high $WO_3$ extraction is obtainable (at least about 99%) from refractory concentrates by a combination of stage addition of $Na_2CO_3$ with partial replacement of $Na_2CO_3$ with NaOH. A substitution of 10% of the $Na_2CO_3$ with NaOH (while maintaining constant Na) increases the yield to at least about 99%.

In carrying out the various embodiments of the invention, the pressure digestion runs were conducted in a Parr two-liter titanium autoclave which has a single 5.8-cm diameter, 6-bladed pitch-blade radial turbine impeller located 2.5 cm off the reactor bottom for agitating the slurry. An electric heating mantle is used as the source of heat. A run is begun by adding a charge of the concentrate to a solution in the reactor along with an aliquot portion of sodium carbonate based on the total predetermined amount of Na$_2$CO$_3$ required to give the desired carbonate concentration and a slurry concentration of the desired percent solids. The slurry to the system. Approximately one-half to three-quarters of an hour is usually required to reach the desired temperature with the timing of the test beginning as soon as the temperature is reached. As digestion progresses, the remaining sodium carbonate is added stage-wise until the total predetermined amount has been added. At the end of the run, the reactor is placed in a water bath to cool the slurry to approximately 70° C.

As stated above, the fractional portion of Na$_2$CO$_3$ may constitute approximately 50% of the predetermined amount to be employed in completing the digestion. However, we need not be limited to 50%. The fractional portion may range from about 30% to 70% or 40% to 60% of the total predetermined amount of Na$_2$CO$_3$ to be used initially in carrying out the digestion. The remaining Na$_2$CO$_3$ may be added all at once or may be added stage-wise or continuously. Thus, stage-wise additions may depend upon the size of the charge and upon the progress of the digestion, or the Na$_2$CO$_3$ may be injected continuously as a slurry or solution over the time period of the digestion.

A two-hour digestion period is considered desirable, particularly when operating at temperatures in the range of about 200° C. to 250° C. or 270° C.

The predetermined amount of sodium carbonate employed following completion of all of the stage-wise additions is selected to correspond substantially to the all-at-once addition of sodium carbonate to produce a solution containing an initial concentration ranging from about 50 gpl to 200 gpl, with the Na$_2$CO$_3$/WO$_3$ weight ratio ranging from about 0.9 to 2, generally from about 1 to 1.6, e.g., about 1 to 1.4.

Broadly, the temperature may range from about 180° C. to 310° C. at pressures ranging from about 145 psig to 1430 psig, e.g., 200° C. to 250° C. or 270° C., preferably from about 200° C. to 235° C., at pressures ranging from about 225 psig to 575 psig or 800 psig.

The high extraction efficiency is achieved in one embodiment by employing the Na$_2$CO$_3$ concentration of the leach solution in substantially inverse relationship with the digestion temperature and in substantially direct relationship with the Na$_2$CO$_3$/WO$_3$ weight ratio, the relationship selected being such as to effect dissolution of at least about 97% of the WO$_3$ in the concentrate, preferably at least about 98%, and provide a pregnant liquor containing said WO$_3$.

It is preferred that the soda ash concentration ranges from about 75 gpl to 175 gpl and more preferably from about 75 gpl to 150 gpl. Likewise, the Na$_2$CO$_3$/WO$_3$ weight ratio preferably ranges from about 1.1 to 1.6, and generally from about 1.1 to 1.4.

Tests have shown that the higher the digestion temperatures, the less is the amount of soda ash needed to achieve high tungsten extraction and the greater is the WO$_3$/Na$_2$CO$_3$ ratio in the pregnant solution. Tests have also shown that with stage-wise addition of Na$_2$CO$_3$, the less is the amount of Na$_2$CO$_3$ required to obtain high extraction efficiency.

At constant initial Na$_2$CO$_3$ concentration with the all-at-once addition, it has been observed that increasing the Na$_2$CO$_3$/WO$_3$ weight ratio increases the percent WO$_3$ extracted to a certain maximum. However, an advantage of the stage-wise addition is that a lower Na$_2$CO$_3$/WO$_3$ weight ratio can be employed to obtain high extraction efficiency, while inhibiting the dissolution of gangue minerals.

As stated in the related application, the concentration of Na$_2$WO$_4$ attained in the pregnant liquor during digestion has a bearing on high dissolution yields. As has been shown, by increasing Na$_2$CO$_3$ to Na$_2$WO$_4$ weight ratio, extraction is increased. Conversely, decreasing this ratio or increasing the amount of Na$_2$WO$_4$ in the pregnant liquor will have a negative effect on the extraction efficiency.

Thus, to assure consistently high dissolution yields, the tungsten concentration constraints can be minimized by leaching to not exceeding about 100 gpl WO$_3$, e.g., about 75 to 95 gpl, and, more preferably, over the range of approximately 90 to 95 gpl WO$_3$.

When the low-grade concentrate is digested, the pregnant liquor containing the sodium tungstate is further treated following filtration to remove such impurities as molybdenum. Any excess sodium carbonate is neutralized with acid and the pH adjusted to that value required to effect precipitation of Mo as MoS$_3$ using H$_2$S as the precipitant. It is important that the WO$_3$/Mo ratio in the purified solution be very high, for example, at least about 20,000/1, and preferably at least about 33,000:1. To achieve this, the discharge pregnant solution should be at least about 60 gpl WO$_3$, and preferably at least about 100 gpl, e.g., about 120 gpl and higher.

One method to achieve the foregoing requirements as disclosed in the related application is to leach to a final Wo$_3$ concentration of less than 100 gpl, for example, to a range of about 75 to 95 gpl, more preferably, approximately 90 to 95 gpl, to obtain a high dissolution yield and then subject the discharge pregnant liquor to flash down to evaporate sufficient solution to increase the concentration of WO$_3$ in the pregnant liquor at least 10% and preferably at least about 15 or 20% or 25% of the original concentration. The advantages of this technique will be apparent as follows.

As illustrative of the preferred embodiment of the invention, the following example is given:

EXAMPLE

Experiments illustrating the effectiveness of stage-wise addition of Na$_2$CO$_3$ for improving digestion efficiency of CanTung scheelite concentrates are summarized in Table II.

The CanTung concentrates tested are given in Table I as follows:

TABLE I

| Type Conc. | Sample No. | WO$_3$ % | CaO % | SiO$_2$ % | Mg % | −325 Mesh | −200 Mesh |
|---|---|---|---|---|---|---|---|
| Non-Leachable Flotation | (I) | 15 | 38.2 | 4.2 | 4.3 | 88 | 98 |
| Non-Leachable Flotation | (II)* | 31.7 | 34 | 5.7 | 2.3 | 78 | 91 |
| Non-Leachable Flotation | (III)* | 29 | 18.7 | 16.3 | 5.1 | 78 | 86 |
| Non-Leachable | (IV)* | 29 | — | — | — | 77 | 94 |

TABLE I-continued

| Type Conc. Gravity | Sample No. | $WO_3$ % | CaO % | $SiO_2$ % | Mg % | −325 Mesh | −200 Mesh |
|---|---|---|---|---|---|---|---|

*These are defined as refractory concentrates.

TABLE II

| Test No. | $Na_2CO_3$ Add'n. Method | Sample No. | $Na_2CO_3$/ $WO_3$, Wt. Ratio | Initial $Na_2CO_3$, gpl | Final $WO_3$, gpl | $WO_3$ Extr. % |
|---|---|---|---|---|---|---|
| 1 | All-at-once | (II) | 1.2 | 150 | 125 | 97.6 |
| 2 | " | " | 1.4 | 175 | 120 | 97.1 |
| 3 | " | " | 1.6 | 150 | 95 | 98.8 |
| 4 | Stage Addn.* | " | 1.2 | 150 | 125 | 99.1 |
| 5 | All-at-once | (IV) | 1.2 | 150 | 120 | 97.7 |
| 6 | Stage Addn.* | " | " | " | 125 | 99.0 |
| 7 | All-at-once | (III) | 1.2 | 150 | 120 | 97.1 |
| 8 | Stage Addn.* | " | " | " | 125 | 98.5 |
| 9 | All-at-once | (I) | 1.2 | 150 | 125 | 99.7 |
| 10 | Stage Addn.* | " | " | " | 125 | 99.5 |

*One-half of $Na_2CO_3$ was added at the beginning, the remainder upon attaining 230° C.

In Test Nos. 1 to 3, refractory concentrate (II) was digested for two hours at 230° C. with an all-at-once addition of $Na_2CO_3$ with the weight ratio of $Na_2CO_3$/$WO_3$ being 1.2, 1.4 and 1.6, respectively. As will be noted with the all-at-once addition, as the weight ratio of $Na_2CO_3$/$WO_3$ increases, the extraction efficiency increases from 97.6% to 98.8%.

On the other hand, by using a stage-wise addition as in Test No. 4, a $Na_2CO_3$/$WO_3$ weight ratio of only 1.2 is needed to reach an extraction efficiency of 99.1%, thus requiring less $Na_2CO_3$ per pound of $WO_3$, a saving of at least 25% compared to the ratio of 1.6 for Test No. 3 which gave an extraction yield of 98.8%. This was achieved by employing only one-half of the soda ash in the initial charge, the rest being injected stage-wise or continuously after the heat-up period. By controlling the addition of soda ash during digesting, high alkalinity is avoided during digestion normally conducive to substantial dissolution of gangue minerals.

Similar experiments were conducted with refractory concentrates (IV) and (III) (Test Nos. 5 to 8). The results obtained with the stage-wise addition were superior to those obtained with the all-at-once addition.

As regards Test Nos. 9 and 10 with concentrate (I), which was not as refractory as concentrates (II) to (IV), it will be noted that this concentrate worked as well with both the all-at-once addition and the stage-wise addition. Concentrate (I) had a finer particle size.

Tests 2 and 3 show the effects of trying to improve $WO_3$ extraction of the refractory concentrate (II) by increasing the amount of $Na_2CO_3$ in the initial charge, without resorting to stage addition. In Test 2, the $Na_2CO_3$ was increased without increasing the amount of water used, so that the $Na_2CO_3$ concentration was increased. In Test 3, both the $Na_2CO_3$ and water were increased so as not to increase the $Na_2CO_3$ concentration. Neither procedure was as effective as the stage addition of $Na_2CO_3$ (Test 4).

An advantage of the beneficial effect of stage-wise addition is that it maintains a relatively low $Na_2CO_3$ concentration, which minimizes dissolution of gangue, as well as the formation of $Na_2CO_3.XCaCO_3$ double salt. Double salt not only wastes soda ash by its precipitation into the tails, but also results in the formation of scales on the walls of the autoclave. When the stage-wise addition of $Na_2CO_3$ was used to maximize $WO_3$ extraction from refractory concentrates, a high-pressure pump was employed for carrying out the stage-wise addition by injection. Water is needed to slurry the sodium carbonate prior to its injection into the autoclave. Thus, depending on the design of the leach circuit, the water balance can be tight when treating very low-grade scheelite concentrates (less than 12% $WO_3$).

EFFECT OF CAUSTIC SODA ADDITION

As stated previously, the replacement of a small amount of $Na_2CO_3$ with NaOH can be beneficial in enhancing the extraction yield of $WO_3$ when employing the stage-wise addition feature of the invention. The Japanese literature reports that tungsten extraction can be enhanced if a minor portion of the soda ash is replaced with NaOH. However, tests have shown that too much sodium hydroxide has a negative effect and in addition increases the tendency for silica to dissolve. In working with concentrate (I), the following comparison was made:

TABLE III

| Initial NaOH, gpl | Initial $Na_2CO_3$, gpl | T, °C. | Extraction $WO_3$ % |
|---|---|---|---|
| 0 | 75 | 230 | 95 |
| 6 | 69 | 230 | 97 |
| 12 | 63 | 230 | 89 |

As will be noted, when 6 gpl $Na_2CO_3$ was replaced with 6 gpl NaOH, the extraction was increased by 2% and then fell to 89% when 12 gpl NaOH was substituted for 12 gpl $Na_2CO_3$. Thus, the amount of NaOH should not exceed about 10% of the predetermined amount soda ash and preferably range up to about 8% when employed as an adjunct to stage-wise addition of $Na_2CO_3$.

GRINDING PRIOR TO DIGESTION

Also as stated previously, grinding of the concentrate to enhance $WO_3$ extraction can be employed as an adjunct to stage-wise addition of $Na_2CO_3$. The effects of grinding on subsequent digestion response are summarized in Table IV below. While fine grinding can increase the amount of tungsten that is solubilized under a given leaching condition, a disadvantage is the increased quantity of water retained in the filter cake.

TABLE IV

| Milling Time, hrs. | −400 Mesh, % | Feed No. | Leach T, °C.* | $WO_3$ Extn., % | Filter Cake |
|---|---|---|---|---|---|
| 0 | 71. | (II) | 200 | 95.2 | 20 |
| 1 | 93. | " | " | 94.7 | 22 |
| 3 | 98.7 | " | " | 99.4 | 34 |
| 0 | 83. | (I) | 180 | 94.3 | 11 |
| 1 | 98.7 | " | " | 97.3 | 24 |
| 3 | 99.5 | " | " | 98.2 | 30 |

*All other digestion variables were held constant: 1.2 $Na_2CO_3$/$WO_3$, 75 gpl $Na_2CO_3$, 2 hrs.

Fine grinding to at least about 25 to e.g., at least about 50%, such as at least about 95% through 400 mesh can be beneficial to the enhancement of $WO_3$ extraction.

Fine grinding can, however, increase gangue dissolution.

The stage-wise addition of $Na_2CO_3$ of the invention is particularly applicable to difficult-to leach concentrates of the type containing the following percent ingredients by weight:

| | |
|---|---|
| $WO_2$ | about 2% to 40% (e.g. about 5% to 3%) |
| Mo | up to about 10% |
| F | up to about 10% |
| S | up to about 5% |
| CaO | up to about 30% |
| $SiO_2$ | about 2% to 50% |

The term "at least one stage-wise addition" employed in the description and claims is understood to include adding the remaining fractional portion of soda ash completely, or incremental stages, or continuously.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. In a process for the soda ash digestion of tungsten concentrates wherein a slurry is formed of a concentrate with an aqueous carbonate solution and the slurry digested at a selected elevated temperature, the improvement which comprises:

forming a slurry of the concentrate with an aqueous solution of sodium carbonate, the amount of sodium carbonate being a fractional portion of an amount predetermined to effect substantially complete dissolution of the tungsten as $WO_3$ equivalent in said concentrate at the temperature selected for said digestion, said predetermined amount of sodium carbonate being such that the $Na_2CO_3/WO_3$ weight ratio ranges from about 0.9 to 2, digesting said concentrate with said solution containing said fractional portion of sodium carbonate at a selected temperature in the range of about 180° C. to 310° C., and then, while said slurry is being digested at said selected temperature, adding the remaining fractional portion of said sodium carbonate in at least one stage-wise addition to control the concentration thereof in said solution during digestion and effect substantially complete dissolution of said $WO_3$ in said concentrate while inhibiting substantial dissolution of gangue minerals, the total amount of said predetermined sodium carbonate following at least one stage-wise addition being such as to provide a concentration corresponding to an all-at-once addition of sodium carbonate of initial concentration ranging from about 50 gpl to 200 gpl over said $Na_2CO_3/WO_3$ weight ratio of 0.9 to 2, with the concentration of $Na_2CO_3$ substantially inversely correlated to the digestion temperature and substantially directly correlated to the $Na_2CO_3/WO_3$ weight ratio, whereby at least about 97% of the $WO_3$ equivalent in said concentrate is dissolved to provide a pregnant solution thereof at the desired concentration.

2. The process of claim 1, wherein the total predetermined amount of said sodium carbonate employed following said at least one stage-wise addition corresponds to an all-at-once addition of $Na_2CO_3$ ranging from about 75 to 175 gpl, the $Na_2CO_3/WO_3$ weight ratio from about 1 to 1.6, with the temperature ranging from about 200° C. to 250° C.

3. The process of claim 1, wherein the concentration of $Na_2CO_3$, the temperature and the $Na_2CO_3/WO_3$ weight ratio are correlated to control the $WO_3$ concentration in the pregnant solution following stage-wise digestion to a level not exceeding about 100 gpl.

4. The process of claim 3, wherein the $WO_3$ concentration in the pregnant liquor following stage-wise digestion is controlled to a level ranging from about 75 gpl to 95 gpl over a temperature range of about 200° C. to 250° C. and a pressure of about 225 psig to 575 psig, while inhibiting the dissolution of gangue minerals.

5. The process of claim 3, wherein following substantially complete digestion of the $WO_3$ in the concentrate, the pregnant liquor is flashed to the atmosphere to effect evaporation of water in the pregnant liquor sufficient to increase the $WO_3$ concentration in said liquor by at least about 10% of the pregnant liquor concentration prior to flash down.

6. The process of claim 5, wherein the level of $WO_3$ in the pregnant liquor is approximately 90 to 95 gpl and the liquor thereafter is flashed to increase the $WO_3$ concentration by at least about 15% of the original concentration.

7. The process of claim 1, wherein up to about 10% of NaOH is added to replace a corresponding amount of the predetermined $Na_2CO_3$ by weight employed in the digestion of said tungsten concentrate to further enhance the extraction yield of the contained $WO_3$.

8. The process of claim 1, wherein the concentrate is ground to provide a size such that at least about 25% passes through 400 mesh to further enhance the extraction yield of the contained $WO_3$.

9. In a process for the soda ash digestion of low-grade scheelite concentrates containing by weight about 2% to 40% $WO_3$ and a least about 2% silica, wherein a slurry is formed of the concentrate with an aqueous carbonate solution and the slurry digested at a selected elevated temperature, the improvement which comprises:

forming a slurry of the concentrate with an aqueous solution of sodium carbonate, the amount of sodium carbonate being a fractional portion ranging from about 30% to 70% of an amount predetermined to effect substantially complete dissolution of the tungsten as $WO_3$ equivalent in said concentrate at the temperature selected for said digestion, said predetermined amount of sodium carbonate being such that the $Na_2CO_3/WO_3$ weight ratio ranges from about 0.9 to 2, digesting said concentrate with said solution containing said fractional portion of sodium carbonate at a selected temperature in the range of about 180° C. to 310° C., and then, while said slurry is being digested at said selected temperature, adding the remaining fractional portion of said sodium carbonate in at least one stage-wise addition to control the concentration thereof in said solution and effect substantially complete dissolution of said $WO_3$ in said concentrate, while inhibiting substantial dissolution of gangue minerals, the total amount of said pre-determined sodium carbonate following said at least one stage-wise addition being such as to provide a concentration corresponding to an all-at-once addition of sodium carbonate of initial concentration ranging from about 50 gpl to 200 gpl over said $Na_2CO_3/WO_3$ weight ratio of 0.9 to 2 with the concentration of $Na_2CO_3$ substantially inversely correlated to the digestion temperature and substantially directly correlated to the $Na_2CO_3/WO_3$ weight ratio, whereby at least about 97% of the $WO_3$ equivalent in said concentrate is dissolved to provide a pregnant solution thereof at the desired concentration.

10. The process of claim 9, wherein the total predetermined amount of said sodium carbonate employed following said at least one stage-wise addition corresponds to an all-at-once addition of $Na_2CO_3$ ranging from about 75 to 175 gpl, the $Na_2CO_3/WO_3$ weight ratio from about 1.1 to 1.6, with the temperature ranging from about 200° C. to 250° C.

11. The process of claim 9, wherein the concentration of $Na_2CO_3$, the temperature and the $Na_2CO_3/WO_3$ weight ratio are correlated to control the $WO_3$ concentration in the pregnant solution following stage-wise digestion to a level not exceeding about 100 gpl.

12. The process of claim 11, wherein the $WO_3$ concentration in the pregnant liquor following stage-wise digestion is controlled to a level ranging from about 75 gpl to 95 gpl over a temperature range of about 200° C. to 250° C. and a pressure of about 225 psig to 575 psig, while inhibiting the dissolution of gangue minerals.

13. The process of claim 11, wherein following substantially complete digestion of the $WO_3$ in the concentrate, the pregnant liquor is flashed to the atmosphere to effect evaporation of the pregnant liquor sufficient to increase the $WO_3$ concentration in said liquor by at least about 10% of the pregnant liquor concentration prior to flash down.

14. The process of claim 15, wherein the level of $WO_3$ in the pregnant liquor is approximately 90 to 95 gpl and the liquor thereafter is flashed to increase the $WO_3$ concentration by at least about 15% of the original concentration.

15. The process of claim 9, wherein up to about 10% of NaOH is added to replace a corresponding amount of the predetermined $Na_2CO_3$ by weight employed in the digestion of said tungsten concentrate to further enhance the contraction yield of the contained $WO_3$.

16. The process of claim 9, wherein the concentrate is ground to provide a size such that at least 25% passes through 400 mesh to further enhance the extraction yield of the contained $WO_3$.

17. In a process for the soda ash digestion of low-grade scheelite concentrates containing by weight about 2% to 40% $WO_3$ and at least about 2% silica, wherein a slurry is formed of the concentrate with an aqueous carbonate solution and the slurry digested at a selected elevated temperature, the improvement which comprises:

forming a slurry of the concentrate with an aqueous solution of sodium carbonate, the amount of sodium carbonate being fractional portion ranging from about 30% to 70% of an amount predetermined to effect substantially complete dissolution of the tungsten as $WO_3$ equivalent in said concentrate at the temperature selected for said digestion, said predetermined amount of sodium carbonate being such that the $Na_2CO_3/WO_3$ weight ratio ranges from about 0.9 to 2, digesting said concentrate with said solution containing said fractional portion of sodium carbonate at a selected temperature in the range of about 180° C. to 310° C. and at a pressure range from about 145 psig to 1430 psig, and then, while said slurry is being digested at said selected temperature, adding the remaining fraction portion of said sodium carbonate in at least one stage-wise addition to control the concentration thereof in said solution and effect substantially complete dissolution of said $WO_3$ in said concentrate while inhibiting substantial dissolution of gangue minerals, the total amount of said predetermined sodium carbonate employed following said at least stage-wise addition being such as to provide a concentration corresponding to an all-at-once addition of sodium carbonate of initial concentration ranging from about 50 gpl to 200 gpl over said $Na_2CO_3/WO_3$ weight ratio of 0.9 to 2 with the concentration of $Na_2CO_3$ substantially inversely correlated to the digestion temperature and substantially directly correlated to the $Na_2CO_3/WO_3$ weight ratio, such as to effect dissolution of at least about 97% of the $WO_3$ in the concentrate and provide a pregnant liquor containing said $WO_2$ at a concentration level not exceeding about 100 gpl, and then flashing said pregnant liquor to the atmosphere to effect evaporation of the pregnant liquor sufficient to increase the $WO_3$ concentration in said liquor by at least 10% of the pregnant liquor prior to flash down.

18. The process of claim 17, wherein the total predetermined amount of said sodium carbonate employed following at least one stage-wise addition corresponds to an all-at-once addition of $Na_2CO_3$ ranging from about 75 to 175 gpl, the $Na_2CO_3/WO_3$ weight range from about 1.1 to 1.6 and the temperature from about 200° C. to 250° C.

19. The process of claim 17, wherein the $WO_3$ concentration in the pregnant liquor following stage-wise digestion is controlled to a level ranging from about 75 gpl to 95 gpl over a temperature range of about 200° C. to 250° C. and a pressure of about 225 psig to 575 psig, while inhibiting the dissolution of gangue minerals.

20. The process of claim 19, wherein the level of $WO_3$ in the pregnant liquor is approximately 90 to 95 gpl and the flash down of said liquor is such as to increase the $WO_3$ concentration by at least about 15% of the original concentration.

21. The process of claim 17, wherein up to about 10% of NaOH are added to replace a corresponding amount of the predetermined $Na_2CO_3$ by weight employed in the digestion of said tungsten concentrate to further enhance the extraction yield of the contained $WO_3$.

22. The process of claim 17, wherein the concentrate is ground to provide a size such that at least about 25% passes through 400 mesh to further enhance the extraction yield of the contained $WO_3$.

* * * * *